United States Patent
Jung et al.

(10) Patent No.: US 9,083,764 B2
(45) Date of Patent: Jul. 14, 2015

(54) CONTENT CACHING DEVICE FOR MANAGING CONTENTS BASED ON CONTENT USAGE FEATURES

(71) Applicant: Institute for Basic Science, Daejeon (KR)

(72) Inventors: Sangsu Jung, Changwon-si (KR); Okyu Kwon, Daejeon (KR); Joon Heo, Daejeon (KR)

(73) Assignee: INSTITUTE FOR BASIC SCIENCE, Daejeon (KR)

( * ) Notice: Subject to any disclaimer, the term of this patent is extended or adjusted under 35 U.S.C. 154(b) by 228 days.

(21) Appl. No.: 13/652,045

(22) Filed: Oct. 15, 2012

(65) Prior Publication Data

US 2014/0040432 A1    Feb. 6, 2014

(30) Foreign Application Priority Data

Aug. 3, 2012  (KR) ........................ 10-2012-0085418

(51) Int. Cl.
*G06F 15/16* (2006.01)
*H04L 29/08* (2006.01)
*G06F 17/30* (2006.01)

(52) U.S. Cl.
CPC ........ *H04L 67/322* (2013.01); *G06F 17/30902* (2013.01); *H04L 67/2852* (2013.01)

(58) Field of Classification Search
CPC .. H04L 67/16; H04L 67/2852; H04L 67/2842
See application file for complete search history.

(56) References Cited

U.S. PATENT DOCUMENTS

| 5,050,166 A | 9/1991 | Cantoni et al. | |
|---|---|---|---|
| 6,456,308 B1 | 9/2002 | Agranat et al. | |
| 7,461,262 B1 * | 12/2008 | O'Toole, Jr. ................. | 709/202 |
| 7,730,154 B2 | 6/2010 | Agarwalla et al. | |
| 7,864,764 B1 * | 1/2011 | Ma et al. ....................... | 370/389 |
| 2007/0156961 A1 * | 7/2007 | Houzenga et al. ............ | 711/118 |
| 2008/0320222 A1 * | 12/2008 | Dhodapkar .................... | 711/118 |
| 2014/0013053 A1 * | 1/2014 | Sawin et al. .................. | 711/122 |

FOREIGN PATENT DOCUMENTS

KR    1020110060675    6/2011

* cited by examiner

*Primary Examiner* — Liangche A Wang
*Assistant Examiner* — Ayele Woldemariam
(74) *Attorney, Agent, or Firm* — Lowe Hauptman & Ham, LLP (57) ABSTRACT

The present invention relate to a content caching device, and more particularly, to such a content caching device in which the priority of a content requested by a user terminal is calculated based on content usage features such as the number of requests or the latest request interval of the requested content, and the like, the requested content is controlled to be selectively stored in a short-term storage unit based on the calculated priority of the requested content, and among the contents stored in the short-term storage unit, a content needed to be stored for a long time period is controlled to be stored in a separate long-term storage unit based on the storage time of the requested content in the short-term storage unit.

11 Claims, 7 Drawing Sheets

| Priority | Types | The number of requests | Latest request interval (min) | Storage time (day) |
|---|---|---|---|---|
| 1 | content 1 | 5 | 65 | 4.25 |
| 2 | content 2 | 5 | 121 | 5.80 |
| 3 | content 3 | 4 | 250 | 7.21 |
| 4 | content 4 | 8 | 470 | 13.97 |
| ⋮ | | | | |
| n-1 | content n-1 | 13 | 953 | 29.23 |
| n | content n | 2 | 61 | 2.94 |

| Priority | Types | The number of requests | Latest request interval (min) | Storage time (day) |
|---|---|---|---|---|
| 1 | content 1 | 3 | 65 | 4.25 |
| 2 | content 2 | 3 | 121 | 5.80 |
| 3 | content 3 | 2 | 256 | 7.21 |
| 4 | content 4 | 2 | 278 | 13.97 |
| 5 | content 5 | 2 | 695 | 30.14 |
| 6 | content 6 | 1 | | |
| | | | | |

FIG 8

| Priority | Types | Storage time (day) |
|---|---|---|
| 1 | content 1 | 6.38 |
| 2 | content 2 | 12.97 |
| 3 | content 3 | 19.71 |
| 4 | content 4 | 37.18 |
| 5 | content 5 | 38.87 |
| | | |
| | | |

CONTENT CACHING DEVICE FOR MANAGING CONTENTS BASED ON CONTENT USAGE FEATURES

CROSS-REFERENCE TO RELATED APPLICATIONS

This application claims the benefit of Korean Patent Application No. 10-2012-0085418, filed on Aug. 3, 2012 in the Korean Intellectual Property Office, which is incorporated herein by reference in its entirety.

BACKGROUND OF THE INVENTION

1. Field of the Invention

Exemplary embodiments of the present invention relate to a content caching device, and more particularly, to such a content caching device in which the priority of a content requested by a user terminal is calculated based on content usage features such as the number of requests or the latest request interval of the requested content, and the like, the requested content is controlled to be selectively stored in a short-term storage unit based on the calculated priority of the requested content, and among the contents stored in the short-term storage unit, a content needed to be stored for a long time period is controlled to be stored in a separate long-term storage unit based on the storage time of the requested content in the short-term storage unit.

2. Description of Related Art

Nowadays, the Internet is widely used, and the Internet users download and use a variety of kinds of contents scattered all over the world through the Internet. In other words, in order for an Internet user to have access to a specific content server and use a content provided by the associated content server, it is required that the content server should transmit a packet data corresponding to the content requested by a user terminal through several routers on the way to the user terminal.

In the case where a plurality of Internet users connects to the same content server and uses the same content, the packet data corresponding to the same content is repeatedly transmitted and received between the same content server and the plurality of Inter users through the Internet. This lead to a problem of increasing a degree of traffic congestion.

In order to address and solve the degree of traffic congestion, a system for storing, providing, and managing contents is proposed, which is named a "content caching system". The content caching system refers to a content storing and providing system in which a content caching device having contents stored therein and connecting to a user terminal is located in a network, and when there is a request for a specific content from a user terminal, the content caching device directly provides a corresponding content stored therein to the user terminal instead of downloading the corresponding content from a content server and providing it to the user terminal, so that the degree of traffic congestion is prevented from being increased and the content desired by the user can be promptly provided to the user terminal.

The content caching device of the above-mentioned conventional content caching system provides the requested content stored in a storage unit to the user terminal, or downloads the requested content from the content server and provides it to the user terminal if the requested content is not stored in the storage unit. The downloaded content is stored in the storage unit, and if there is a request for the same content as the downloaded content from the user terminal or an neighboring user terminal later, the content caching device directly provides the requested content stored in the storage unit to the user terminal or the neighboring user terminal without downloading the requested content from the content server.

However, the conventional content caching device entails a problem in that it stores all the contents requested by the user terminal in the storage unit without taking into consideration the content usage features of the user terminal, so that the storage unit is not used efficiently. That is, such a conventional content caching device stores all the contents in a limited storage space without considering the content usage features, so that the storage efficiency of the storage unit is reduced and the content caching device re-downloads a content deleted due to the excess of the storage capacity from the storage unit, thereby increasing the degree of traffic congestion.

SUMMARY OF THE INVENTION

Accordingly, the present invention has been made to solve the above-mentioned problems involved in the conventional prior art, and it is an object of the present invention to provide a content caching device which is configured to store contents in a short-term storage unit depending on a priority based on the content usage features, and classify contents needed to be stored for a long time period due to a high possibility of being used among the contents stored in the short-term storage unit and store the classified contents in a long-term storage unit.

Another object of the present invention is to provide a content caching device which is configured to classify only contents having a high possibility of being used based on the content usage features and store the classified contents in a short-term storage unit and a long-term storage unit, thereby promptly retrieving a content requested by a user terminal.

Still another object of the present invention is to provide a content caching device which is configured to control contents having a high possibility of being used to be stored based on the content usage features, thereby reducing the degree of traffic congestion due to the repeated downloading of the same content.

Yet another object of the present invention is to provide a content caching device which is configured to selectively forward contents stored in a long-term storage unit to a neighboring content caching device located within a one-hop distance, so that user groups having the same or similar dispositions can promptly retrieve a desired content.

To achieve the above objects, in one aspect, the present invention provides a content caching device including: a request service unit configured to receive a content request message requesting a content from a user terminal; a content storage unit including a short-term storage unit and a long-term storage unit, which are configured to store contents; a control unit configured to control the requested content to be stored in the short-term storage unit depending on the number of requests or the latest request information of the requested content, which is calculated based on an identifier of the requested content, which is included in the content request message, and the received time of the content request message, and configured to control the requested content to be transferred to the long-term storage unit from the short-term storage unit and stored in the long-term storage unit based on the storing time of the short-term storage unit.

Preferably, the content caching device according to the present invention may further include: a search engine unit configured to retrieve a content matching with the requested content from the short-term storage unit and the long-term storage unit; and a content downloading unit configured to request the content matching with the requested content to be downloaded from the content server if the content matching with the requested content does not exist in the short-term storage unit or the long-term storage unit based on a result of retrieval of the content by the search engine unit.

In the content caching device according to the present invention, preferably, the search engine unit may primarily retrieve the content matching with the requested content from the long-term storage unit, and as a result of the primary retrieval, if the content matching with the requested content does not exist in the long-term storage unit, the search engine unit may secondarily retrieve the content matching with the requested content from the short-term storage unit. In addition, the content downloading unit may be controlled to download the requested content if the content matching with the requested content is not retrieved from the long-term storage unit and the short-term storage unit.

In the content caching device according to the present invention, preferably, the control unit may include: a priority value calculating unit configure to calculate a priority value of the requested content based on the number of requests or the latest request information of the requested content; a short-term control unit configured to compare the calculated priority value of the requested content with a priority value of a short-term content stored in the short-term storage unit to determine the priority of the requested content, and control the short-term content previously stored in the short-term storage unit to be updated in the short-term storage unit based on the determined priority of the requested content; and a long-term control unit configured to control the short-term content to be transferred to the long-term storage unit from the short-term storage unit and stored in the long-term storage unit based on the storage time of the short-term content stored in the short-term storage unit.

Preferably, in the content caching device according to the present invention, if a new short-term content is transferred to the long-term storage unit, the long-term storage control unit may control the new short-term content to be stored in the long-term storage unit in the transferred order, and if the storage capacity of the long-term storage unit is exceeded, the long-term storage control unit may control the long-term contents stored in the long-term storage unit to be deleted from the long-term storage unit in the order in which the long-term contents have been stored for the longest time period.

In the content caching device according to the present invention, preferably, the priority value calculating unit may include: a counting unit configured to count the number of requests of the requested content per a unit time period based on the identifier of the requested content included in the content request message; a latest request interval calculating unit configured to calculate a latest request interval of the requested content based on a difference between the received time of a previous content request message requesting the requested content and the received time of a current content request message requesting the requested content; and a calculating unit configured to calculate the priority value of the requested content based on the number of requests or the latest request information of the requested content.

Preferably, the content caching device according to the present invention may further include a content distributing unit configured to control a long-term retained content determined to be stored for more than a threshold time period based on the storage time of the long-term contents stored in the long-term storage unit to be transmit to and stored in a neighboring content caching device.

In the content caching device according to the present invention, preferably, the neighboring content caching device may be located within a one-hop distance from the content caching device.

In another aspect, the present invention provides content caching device including: a content storage unit including a short-term storage unit and a long-term storage unit, which are configured to store contents; a priority value calculating unit configured to calculate the number of requests or the latest request information of a content requested by a user terminal based on an identifier of the requested content, which is included in a content request message received from the user terminal, and calculate a priority value of the requested content based on the number of requests or the latest request information of the requested content; a short-term control unit configured to determine the priority of the requested content based on the calculated priority value of the requested content, and control the requested content to be stored in the short-term storage unit based on the determined priority of the requested content; and a long-term control unit configured to control a short-term content stored in the short-term storage unit to be transferred to and stored in the long-term storage unit based on the storage time of the short-term content.

BRIEF DESCRIPTION OF THE DRAWINGS

The above and other objects, features and advantages of the present invention will be apparent from the following detailed description of the preferred embodiments of the invention in conjunction with the accompanying drawings, in which.

DESCRIPTION OF SPECIFIC EMBODIMENTS

Hereinafter, a content caching device according to the present invention will be described in more detail with reference to the accompanying drawings.

Figure 1:
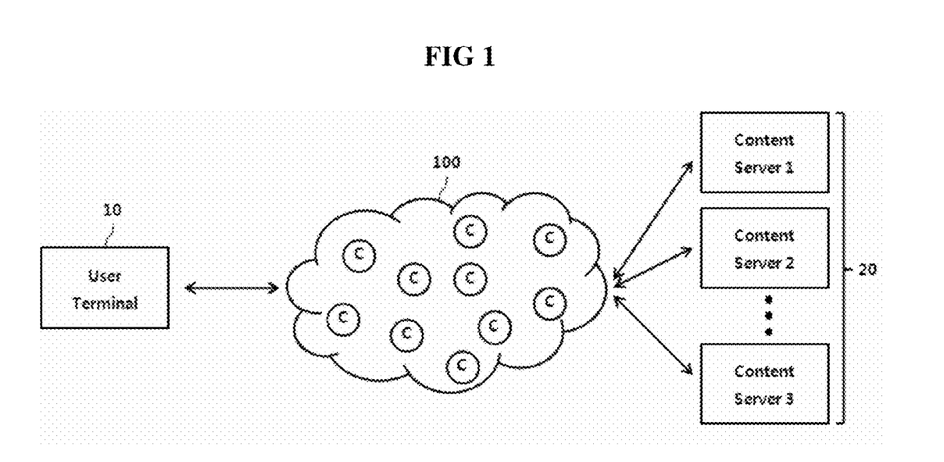
FIG. 1 is a functional block diagram illustrating the overall configuration of a content caching system according to the present invention.

FIG. 1 is a functional block diagram illustrating the overall configuration of a content caching system according to the present invention.

More specifically, referring to FIG. 1, the content caching system according to the present invention includes a network 100, a user terminal 10 for requesting a content, and a plurality of content servers 20 having contents stored therein and configured to provide a corresponding content according to a request of the user terminal.

The network 100 includes a plurality of content caching device C disposed therein. Each content caching device C transmits and receives data to and from an associated content server 20 in a state in which the neighboring user terminal 10 connects to the content caching device C, or is operated as an access point that can transmit and receive data to and from a neighboring content caching device and simultaneously stores contents therein and then provides a content to the user terminal 10 when there is a request for the content from the user terminal 10 connecting to the content caching device C.

A user who desires to use a content has access to a content caching device through the user terminal 10 and requests a content from the content caching device. If the content caching device has the content requested by the user terminal 10 stored therein, it provides the requested content to the user terminal 10. On the contrary, if the content caching device does not have the content requested by the user terminal 10 stored therein, it receives the requested content from a neighboring content caching device and provides the received content to the user terminal 10 or downloads the requested content from the content server 20 directly and provides the downloaded content to the user terminal 10. Meanwhile, the content caching device controls the content provided to the user terminal 10 to be stored therein based on the content features.

Herein, the user terminal 10 is a terminal that can transmit and receive data to and from the network 100 by connecting to the network 100. A personal computer, a smart phone, and the like can be used as the user terminal 10. The user terminal 10 and the content server 20 can be connected to each other through the network 100 in a wired or wireless manner.

Figure 2:
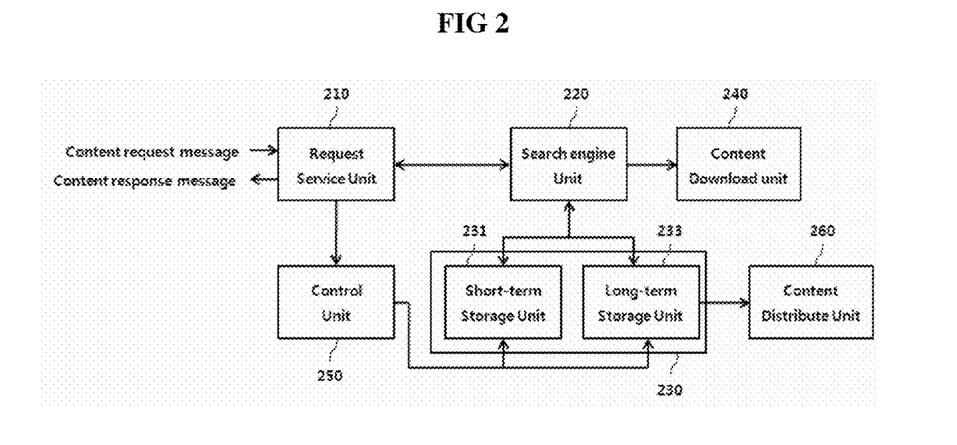
FIG. 2 is a functional block diagram illustrating the configuration of a content caching device of a content caching system according to the present invention.

FIG. 2 is a functional block diagram illustrating the configuration of a content caching device of a content caching system according to the present invention.

More specifically, referring to FIG. 2, the request service unit 210 receives a content request message from the user terminal, creates a content response message including the content requested by the user terminal in response to the received content request message, and transmits the created content response message to the user terminal. First, when the request service unit 210 receives the content request message from the user terminal, it extracts an identifier of the requested content from the content request message and provides the extracted identifier of the requested content to a search engine unit 220.

The search engine unit 220 searches for a content having the same identifier as an identifier of the requested content from the storage unit 230. The storage unit 230 includes a short-term storage unit 231 and a long-term storage unit 233. The search engine unit 220 primarily retrieves the content having the same identifier as the identifier of the requested content in the long-term storage unit 233. As a result of the primary retrieval, if the content having the same identifier as the identifier of the requested content does not exist in the long-term storage unit 233, the search engine unit 220 secondarily retrieves the content having the same identifier as the identifier of the requested content in the short-term storage unit 231. Based on the result of the primary and secondary retrieval, if the content having the same identifier as the identifier of the requested content exists in the short-term storage unit 231 or the long-term storage unit 233, the search engine unit 220 provides the retrieved requested content to the request service unit 210.

On the other hand, if the content having the same identifier as the identifier of the requested content does not exist in the short-term storage unit 231 or the long-term storage unit 233 based on a result of retrieval of the content by the search engine unit 220, the content downloading unit 240 connects to the content server that provides the requested content and downloads the requested content from the content server to provide it to the search engine unit 220. Then, the search engine unit 220 provides the downloaded requested content to the request service unit 210. The request service unit 210 generates a request response message including the requested content and transmits the generated request response message to the user terminal.

Each time the request service unit 210 receives a content request message from the user terminal, the control unit 250 determines the number of requests or the latest request information of the requested content based on an identifier of the requested content, which is included in the content request message, and the received time of the content request message, and calculates a priority of the requested content based on the determined number of requests of the requested content or latest request information. In the meantime, the control unit 250 controls the requested content to be stored in the short-term storage unit 231 depending on the calculated priority of the requested content, or determines contents needed to be stored for a long time period due to a high possibility of being used among the contents stored in the short-term storage unit 231 and controls the determined contents to be transferred to the long-term storage unit 233 from the short-term storage unit 231. Herein, the latest request information refers to information for determining how often the requested content is requested based on the current time point. In the present invention, as an example of the latest request information, a latest request interval may be used, but not limited thereto and various types of latest request information may be used depending on a field to which the present invention is applied.

Meanwhile, a content distributing unit 260 controls a long-term retained content stored for more than a threshold time period among the long-term contents stored in the long-term storage unit 233 to be transmitted to and stored in a neighboring content caching device. A content having a high priority among contents requested by the user terminal is stored in the short-term storage unit 231, and a content having a high priority stored for more than a first threshold time period among the contents stored in the short-term storage unit 231 is transferred to and stored in the long-term storage unit 233. In this case, since a content stored in the long-term storage unit 233 for more than a second threshold time period is a content having a higher possibility of being requested by the user terminal, the long-term retained content is controlled to be stored in the neighboring content caching device, so that the content caching device can share the content having the higher possibility of being requested by the user terminal with the neighboring content caching device which in turn can promptly provide a long-term retained content requested by a neighboring user terminal connecting to the neighboring content caching device to the neighboring user terminal. Furthermore, a neighboring content caching device located within a one-hop distance from a content caching device is specified as a content caching device to which user groups having the same or similar dispositions connect, and the long-term retained content is controlled to be distributed to and stored in only the neighboring content caching device located within a one-hop distance from the content caching device, so that a content requested by the user groups having the same or similar dispositions can be promptly provided to the user terminal with a decreased degree of traffic congestion.

Figure 3:
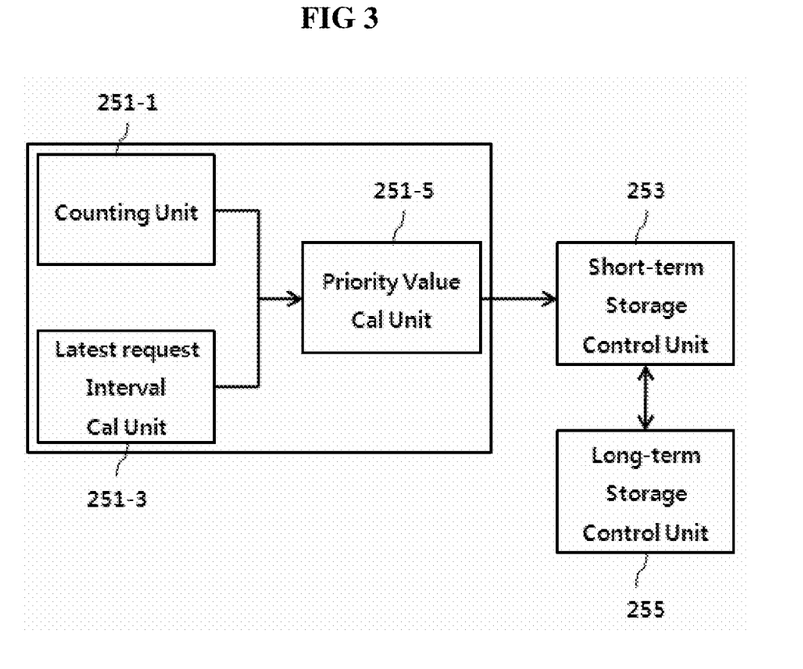
FIG. 3 is a functional block diagram illustrating the configuration of a control unit of a content caching device according to the present invention.

FIG. 3 is a functional block diagram illustrating the configuration of a control unit of a content caching device according to the present invention.

More specifically, referring to FIG. 3, a counting unit 251-1 counts the number of requests of the same content identifier per a unit time period (for example, one week, ten days, or one month) based on an identifier of the requested content included in the content request message each time the request service unit 210 receives the content request message from the user terminal. Meanwhile, a latest request interval calculating unit 251-3 determines a latest request interval from a difference between the received time of a current content request message requesting the requested content and the received time of a previous content request message requesting the requested content. A priority value calculating unit 251-1 calculates a priority value of the requested content based on the number of requests or the latest request interval of the requested content. Preferably, the priority value calculating unit 251-1 calculates a priority value of a requested content of which the number of requests per a unit time period is large and the latest request interval is small such that the priority value is set high.

A short-term storage control unit 253 compares the calculated priority value of the requested content with a priority value of a short-term content stored in the short-term storage unit 231 to determine the priority of the requested content, and the requested content is controlled to be stored in the short-term storage unit or is controlled to be deleted based on the determined priority of the requested content. In the meantime, a long-term storage control unit 255 determines whether or not a content stored in the short-term storage unit 231 is needed to be stored for a long time period, and controls a long-term retained content needed to be stored for a long time period among contents stored in the short-term storage unit 231 to be transferred to the long-term storage unit from the short-term storage unit and stored in the long-term storage unit based on a result of determination. In one example of a method for allowing the long-term storage control unit 255 to determine the long-term retained content, the long-term storage control unit 255 determines a content stored for more than a first threshold time period among the contents stored in the short-term storage unit 231 as the long-term retained content. In another example of a method for allowing the long-term storage control unit 255 to determine the long-term retained content, the long-term storage control unit 255 determines a content, which is stored for more than a first threshold time period and has a priority higher than a threshold priority among the contents stored in the short-term storage unit 231, as the long-term retained content. Only a content having a priority higher than the threshold priority is determined as the long-term retained content, so that a content merely stored in the short-term storage unit 253 for a long time period can be prevented from determined as the long-term retained content. Meanwhile, if the contents stored in the long-term storage unit 233 exceed the capacity of the long-term storage unit 233, the long-term storage control unit 255 controls the first stored content to be deleted depending on the order in which the contents have been stored in the long-term storage unit 233.

Figure 4:
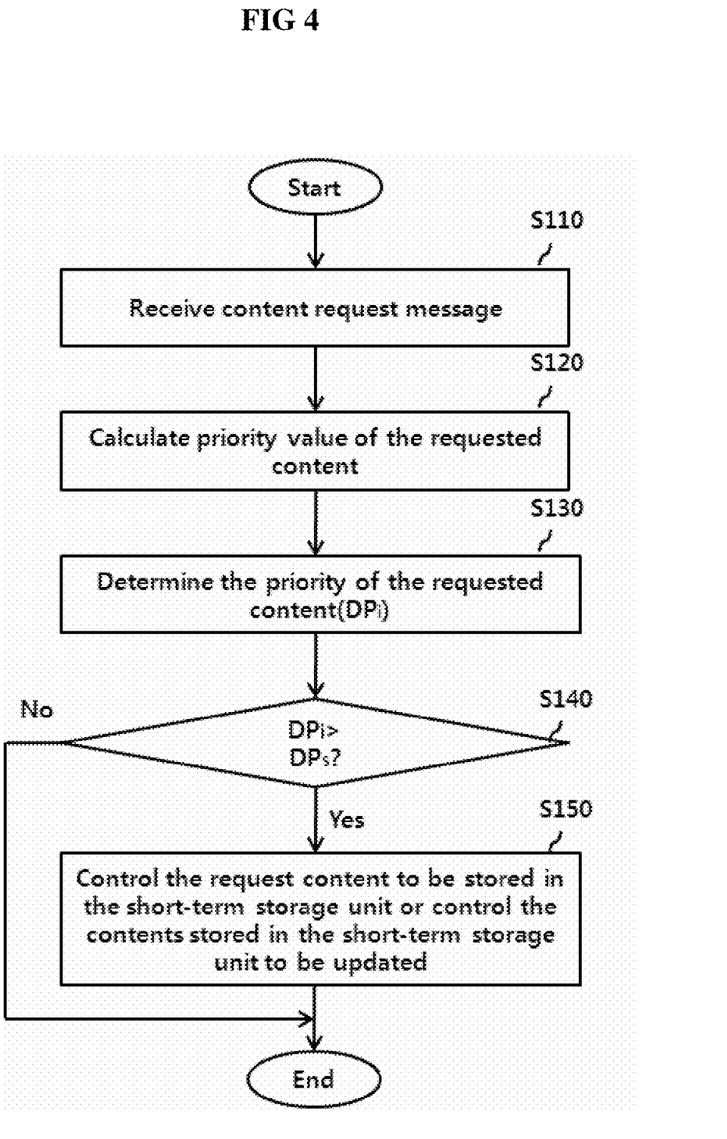
FIG. 4 is a flowchart illustrating a process of storing contents in a short-term storage unit in a content caching device according to the present invention.

FIG. 4 is a flowchart illustrating a process of storing contents in a short-term storage unit in a content caching device according to the present invention.

More specifically, referring to FIG. 4, the request service unit receives a content request message requesting a content from a user terminal at step S110, the program proceeds to step S120 where the control unit extracts an identifier of the requested content from the received content request message and calculates a priority value of the requested content based on the extracted identifier of the requested content and the received time of the content request message. The priority value is calculated based on the number of requests of the requested content or the latest request interval of the requested content. The requested content has a higher priority value as the number of requests of the requested content is larger or the latest request interval of the requested content is smaller. For example, the priority value ($P_i$) of the requested content (i) is calculated by the following Equation 1:

$$P_i = w \cdot n_i + (1 - w) \cdot \frac{k}{|i_{prev} - i_{cur}|} \quad \text{[Equation 1]}$$

wherein $n_i$ is the number of requests of the requested content (i), w is an adjustment weight for the number of requests and the latest request interval of the requested content, k is a constant for adjustment of the latest request interval, and $i_{prev}$ and $i_{cur}$ are the received time of a previous content request message requesting the requested content and the received time of a current content request message requesting the requested content respectively.

Subsequently, the program proceeds to step S130 where the control unit compares the calculated priority value of the requested content with priority values of short-term contents stored in the short-term storage unit to determine the priority of the requested content (DPi), and the program proceeds to step S140 where the control unit determines whether or not the priority of the requested content is higher than the priorities of the contents (DPs) previously stored in the short-term storage unit based on the determined priority of the requested content. If it is determined at step S140 that the priority of the requested content is higher than the priorities of the contents previously stored in the short-term storage unit, the program proceeds to step S150 where the control unit controls the requested content to be stored in the short-term storage unit in the order of the priority. In this case, if the requested content is stored in the short-term storage unit and thus there is a change in the priorities of the contents previously stored in the short-term storage unit, the control unit controls the previously stored contents to be updated in the short-term storage unit. In addition, if the storage capacity of the short-term storage unit is exceeded, the control unit controls a content having the lowest priority to be deleted from the short-term storage unit.

Figure 5:
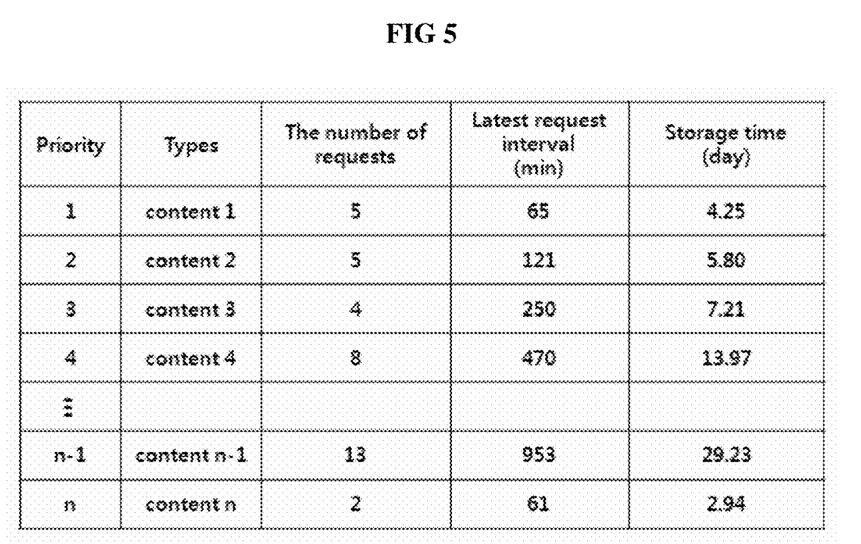
FIG. 5 illustrates an example of a content storage information table of a short-term storage unit according to the present invention.

FIG. 5 illustrates an example of a content storage information table of a short-term storage unit according to the present invention.

Figure 6:
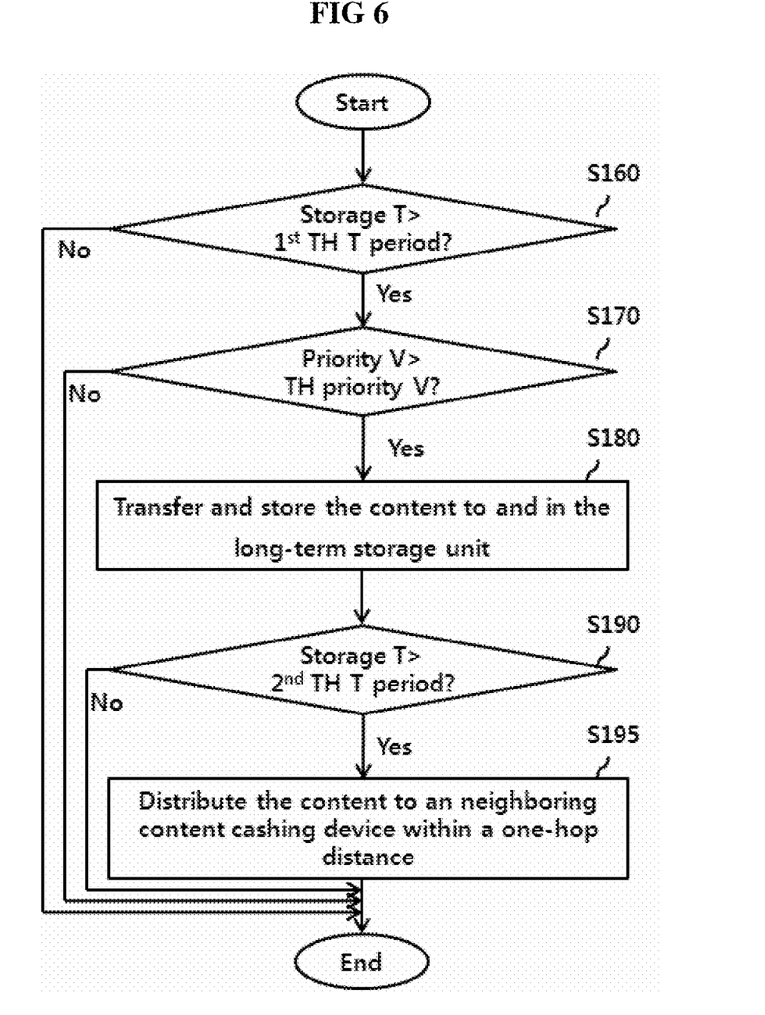
FIG. 6 is a flowchart illustrating a process of storing contents in a long-term storage unit of a content caching device according to the present invention.
Figure 7:
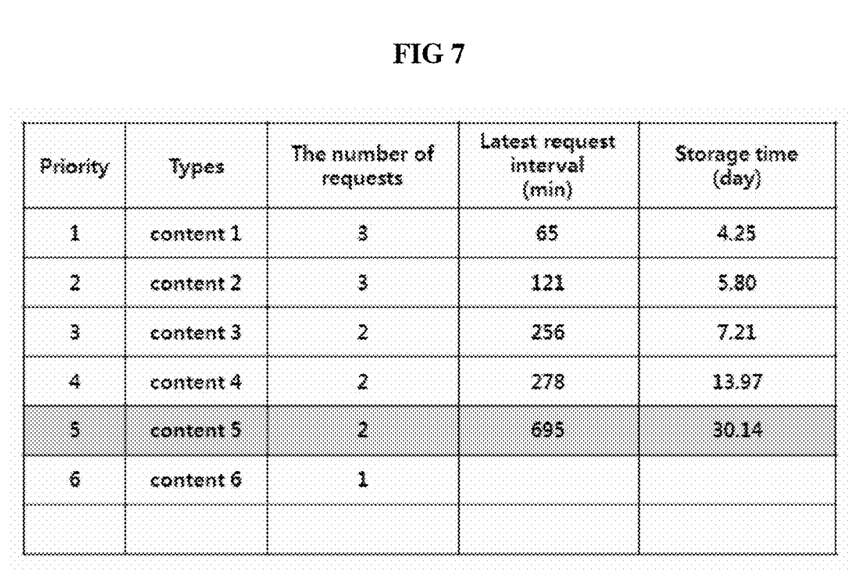
FIG. 7 illustrates an example of a content storage information table of a short-term storage unit according to the present invention.

Referring to FIG. 5, the priorities of the contents are determined in the order in which the priority values of the contents are high depending on the priority values of the contents and is stored in the short-term storage unit. The priority values of a content 1 to a content n are calculated based on the number of requests and the latest request interval of the contents 1 to n. The number of requests, the latest request interval, and the storage time of the contents 1 to n are stored as a table in the short-term storage unit FIG. 6 is a flowchart illustrating a process of storing contents in a long-term storage unit of a content caching device according to the present invention;

More specifically, referring to FIG. 6, the control unit determines whether or not there is a content stored for more than a first threshold time period among the contents stored in the short-term storage unit at step S160. If it is determined at step S160 that there is a content stored for more than the first threshold time period in the short-term storage unit, the program proceeds to step S170 where the control unit determines a priority value of the content is larger than a threshold priority value. In the case where only the contents mostly stored in the long-term storage unit are requested by the user terminal, although a content 5 stored in the short-term storage unit has a low priority value as listed in a content storage information table of the short-term storage unit as shown in FIG. 7, it can be controlled to be stored for more than the first threshold time (i.e., 30 days) in the short-term storage unit. The content 5 whose priority value is smaller than the first threshold priority value among the contents stored in the short-term storage unit is prevented from being transferred to the long-term storage unit from the short-term storage unit and being stored in the long-term storage unit, so that the content 5 having a low priority value is prevented from being stored in the long-term storage unit, or the content 5 having a low priority value is stored in the long-term storage unit and thus contents having a high possibility of being used are prevented from sequentially deleted from the long-term storage unit.

Referring back to FIG. 6, if it is determined at steps S160 and S170 that there is a content whose storage time is more than the first threshold time period and whose priority value is larger than the threshold priority value, the program proceeds to step S180 where the control unit controls the corresponding content to be transferred to the long-term storage unit from the short-term storage unit and stored in the long-term storage unit. The control unit classifies a content having a high possibility of being requested by the user terminal connecting to the content caching device to request a content, and stores the classified content in the long-term storage unit. A content having a high priority value at the current time point is stored in the short-term storage unit based on the priority, so that the storage efficiency of the storage unit can be increased and the content requested by the user terminal can be promptly retrieved and can be provided to the user terminal. In addition, the control unit controls the content having a high possibility of being requested by the user terminal to be stored for a long time period in the long-term storage unit, so that the same content can be prevented from being repeatedly downloaded, thereby decreasing the degree of traffic congestion.

At step S190, the control unit counts the storage time of the contents stored in the long-term storage unit and determines whether or not there is a content stored for more than a second threshold time period in the long-term storage unit. If it is determined at step S190 that there is a long-term retained content whose storage time is more than the second threshold time period, the program proceeds to step S195 where the content distributing unit distributes and stores the long-term retained content to and in a neighboring content caching device located within a one-hop distance from the content caching device. The content stored for more than the second threshold time period among the contents having a high possibility of being requested by the user terminal stored in the long-term storage unit is determined to be a long-term retained content having a higher possibility of being requested by the user terminal and is controlled to be distributed to and stored in a neighboring content caching device. Thus, the neighboring content caching device can previously store a content having a high possibility of being requested by an adjoining user terminal, so that a content requested by the adjoining user terminal can be promptly provided to the user terminal without increasing the degree of traffic congestion.

Figure 8:
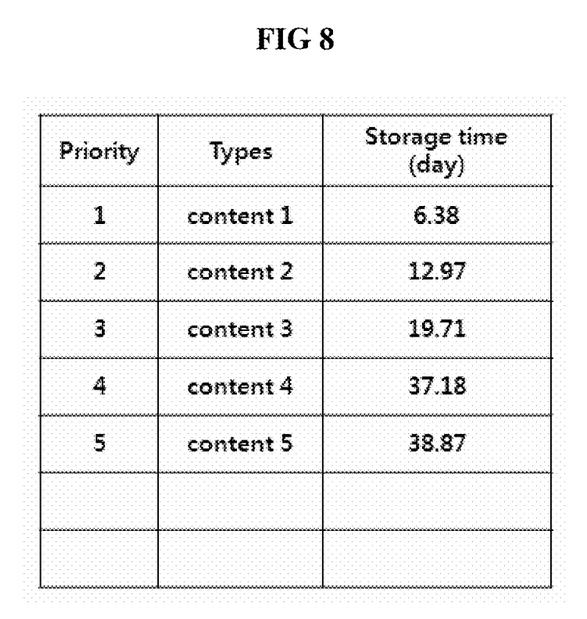
FIG. 8 illustrates an example of a content storage information table of contents stored in a long-term storage unit according to the present invention.

FIG. 8 illustrates an example of a content storage information table of contents stored in a long-term storage unit according to the present invention.

Referring to FIG. 8, the storage time of contents 4 and 5 among the contents stored in the long-term storage unit exceeds the second threshold time period, i.e., 30 days, and thus the contents 4 and 5 are determined to be the long-term retained contents and forwarded to a neighboring content caching device located within a one-hop distance from the content caching device so that the content caching device shares the contents 4 and 5 together with the neighboring content caching device.

Meanwhile, the embodiments of the present invention as described above can be constructed by a computer program that can be executed in a computer and can be implemented in a general-purpose digital computer that operates the program using a computer-readable recording medium.

The computer-readable recording medium includes recording media such as magnetic storage media (e.g., ROMs, floppy disks, hard disks, and the like), optical recording media (e.g., CD-ROMs, DVDs, and the like) and carrier waves (e.g., transmission through the Internet).

As described above, the content caching device according to the present invention has the following various effects.

First, the content caching device according to the present invention stores contents in a short-term storage unit depending on a priority based on the content usage features, and classifies contents needed to be stored for a long time period due to a high possibility of being used among the contents stored in the short-term storage unit and stores the classified contents in a long-term storage unit, so that the content requested by the user terminal can be retrieved promptly and provided to the user terminal.

Second, the content caching device according to the present invention classifies only contents having a high possibility of being used based on the content usage features and stores the classified contents in a short-term storage unit and a long-term storage unit, thereby increasing the storage efficiency of the storage unit.

Third, the content caching device according to the present invention controls contents having a high possibility of being used to be stored based on the content usage features, thereby decreasing the degree of traffic congestion due to the repeated downloading of the same content.

Fourth, the content caching device according to the present invention enables contents stored in a long-term storage unit to be selectively forwarded to a neighboring content caching device located within a one-hop distance, so that user groups having the same or similar dispositions can promptly retrieve a desired content.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

What is claimed is:

1. A content caching device, comprising: a request service unit configured to receive a content request message from a user terminal; a content storage unit configured to store contents, and including a short-term storage unit and a long-term storage unit; and a control unit configured to calculate a priority value of the requested content based on a number of requests or a latest request information of the requested content, control the requested content to be stored in the short-term storage unit, based on the number of requests or the latest request information of the requested content, wherein the number of requests and the latest request information are calculated based on an identifier of the requested content, which is included in the content request message and a received time of the content request message, and control the requested content to be transferred to the long-term storage unit from the short-term storage unit so that the requested content is stored in the long-term storage unit, based on a storing time period of the requested content in the short-term storage unit. Wherein the priority value (P$_i$) of the requested content (i) is calculated by the following Equation 1:

$$P_i = w \cdot n_i + (1-w) \cdot \frac{k}{|i_{prev} - i_{cur}|} \quad \text{[Equation 1]}$$

Wherein n$_i$ is the number of requests of the requested content (i), w is an adjustment weight for the number of requests and a latest request interval of the requested content, k is a constant for adjustment of the latest request interval, and i$_{prev}$ and i$_{cur}$ are a received time of a previous content request message requesting the requested content and a received time of a current content request message requesting the requested content, respectively.

2. The content caching device according to claim 1, further comprising: a search engine unit configured to retrieve a content matching with the requested content from the short-term storage unit and the long-term storage unit; and a content downloading unit configured to request the content matching with the requested content to be downloaded from a content server when the content matching with the requested content is not retrieved from the short-term storage unit or the long-term storage unit based on a result of retrieval of the content by the search engine unit.

3. The content caching device according to claim 2, wherein the search engine unit is configured to retrieve the content matching with the requested content from the long-term storage unit, and when the content matching with the requested content is not retrieved from the long-term storage unit, retrieve the content matching with the requested content from the short-term storage unit, and wherein the content downloading unit is configured to download the requested content when the content matching with the requested content is not retrieved from the long-term storage unit and the short-term storage unit.

4. The content caching device according to claim 1, wherein the control unit comprises: a priority value calculating unit configured to calculate the priority value of the requested content based on the number of requests or the latest request information of the requested content; a short-term control unit configured to compare the calculated priority value of the requested content with a priority value of a short-term content stored in the short-term storage unit to determine the priority of the requested content, and control the short-term content stored in the short-term storage unit to be updated in the short-term storage unit based on the determined priority of the requested content; and a long-term control unit configured to control the short-term content to be transferred to the long-term storage unit from the short-term storage unit so that the short-term content is stored in the long-term storage unit based on a storing time period of the short-term content stored in the short-term storage unit.

5. The content caching device according to claim 4, wherein when a new short-term content is transferred to the long-term storage unit, the long-term storage control unit is configured to control the new short-term content to be stored in the long-term storage unit in an order of transferring, and when the storage capacity of the long-term storage unit is not enough to store the new short-term content, the long-term storage control unit is configured to control long-term contents stored in the long-term storage unit to be deleted from the long-term storage unit in an order in which the long-term contents have been stored for a longest time period.

6. The content caching device according to claim 4, wherein the priority value calculating unit comprises: a counting unit configured to count the number of requests of the requested content per a unit time period based on the identifier of the requested content included in the content request message; a latest request interval calculating unit configured to calculate a latest request interval of the requested content based on a difference between a received time of a previous content request message requesting the requested content and a received time of a current content request message requesting the requested content; and a calculating unit configured to calculate the priority value of the requested content based on the number of requests or the latest request information of the requested content.

7. The content caching device according to claim 1, wherein the neighboring content caching device is located within a one-hop distance from the content caching device.

8. The content caching device according to claim 1, wherein the control unit is further configured to control the requested content to be stored in the short-term storage unit, based on the number of requests and the latest request information of the requested content.

9. A content caching device, comprising: a content storage unit configured to store contents including a short-term storage unit and a long-term storage unit; a priority value calculating unit configured to calculate a number of requests or latest request information of a content requested by a user terminal based on an identifier of the requested content, which is included in a content request message received from the user terminal, and calculate a priority value of the requested content based on the number of requests or the latest request information of the requested content; a short-term control unit configured to determine a priority of the requested content based on the calculated priority value of the requested content, and control the requested content to be stored in the short-term storage unit based on the determined priority of the requested content; and a long-term control unit configured to control a short-term content stored in the short-term storage unit to be transferred to the long-term storage unit so that the short-term content is stored in the long-term storage unit, based on a storing time period of the short-term content in the short-term storage unit. Wherein the priority value (P$_i$) of the requested content (i) is calculated by the following Equation 1:

$$P_i = w \cdot n_i + (1-w) \cdot \frac{k}{|i_{prev} - i_{cur}|} \quad \text{[Equation 1]}$$

Wherein n$_i$ is the number of requests of the requested content (i), w is an adjustment weight for the number of requests and a latest request interval of the requested content, k is a constant for adjustment of the latest request interval, a i$_{prev\ and\ i\ cur}$ are a received time of a previous content request message requesting the requested content and a received time of a current content request message requesting the requested content, respectively.

10. The content caching device according to claim 9, wherein the priority value calculating unit comprises: a counting unit configured to count the number of requests of the requested content per a unit time period based on the identifier of the requested content included in the content request message; a latest request interval calculating unit configured to calculate a latest request interval of the requested content based on a difference between a received time of a previous content request message requesting the requested content and a received time of a current content request message requesting the requested content; and a calculating unit configured to calculate the priority value of the requested content based on the number of requests or the latest request information of the requested content.

11. The content caching device according to claim 9, wherein the priority value calculating unit is further configured to calculate the number of requests and the latest request information of the content requested by the user terminal based on the identifier of the requested content, and calculate the priority value of the requested content based on the number of requests and the latest request information of the requested content.

* * * * *